United States Patent
Vujcic

(10) Patent No.: US 8,295,229 B2
(45) Date of Patent: Oct. 23, 2012

(54) HIGH SPEED ACCESS SYSTEM AND METHOD IN A MOBILE COMMUNICATIONS NETWORK

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 348 days.

(21) Appl. No.: 12/682,233

(22) PCT Filed: Oct. 9, 2008

(86) PCT No.: PCT/KR2008/005942
§ 371 (c)(1),
(2), (4) Date: Apr. 8, 2010

(87) PCT Pub. No.: WO2009/048279
PCT Pub. Date: Apr. 16, 2009

(65) Prior Publication Data
US 2010/0210243 A1    Aug. 19, 2010

Related U.S. Application Data

(60) Provisional application No. 60/978,762, filed on Oct. 10, 2007.

(51) Int. Cl.
*H04W 4/00* (2009.01)
(52) U.S. Cl. ......... 370/328; 370/329; 370/338; 455/130

(58) Field of Classification Search .................. 370/328, 370/329, 338; 455/130
See application file for complete search history.

(56) References Cited

U.S. PATENT DOCUMENTS

| | | | |
|---|---|---|---|
| 2007/0171995 A1 | 7/2007 | Muharemovic et al. | |
| 2007/0230600 A1* | 10/2007 | Bertrand et al. | 375/260 |
| 2007/0253465 A1 | 11/2007 | Muharemovic et al. | |
| 2008/0080472 A1 | 4/2008 | Bertrand et al. | |
| 2009/0046629 A1* | 2/2009 | Jiang et al. | 370/328 |

* cited by examiner

*Primary Examiner* — Ajit Patel
*Assistant Examiner* — Julio Perez
(74) *Attorney, Agent, or Firm* — Lee, Hong, Degerman, Kang & Waimey

(57) ABSTRACT

A method of selecting signatures for a random access in a wireless communication system is presented. The method includes receiving information comprising at least one root sequence index, a cyclic shift parameter, and a configuration parameter that corresponds to different power metric threshold values, providing at least one root sequence table for random access transmission according to the configuration parameter, and accessing the at least one root sequence table is accessed to generate a predetermined number of signatures for accessing the base station, the at least one root sequence table accessed according to the at least one root sequence index and the cyclic shift parameters, wherein the root sequence table comprises a plurality of root sequences arranged in first and second root sequence groups.

14 Claims, 16 Drawing Sheets

(a)

(b)

(a)

(b)

Hybrid alternate ordering, desending first (a)

Hybrid alternate ordering, ascending first (b)

Figure: CM versus hybrid ordering

HIGH SPEED ACCESS SYSTEM AND METHOD IN A MOBILE COMMUNICATIONS NETWORK

CROSS-REFERENCE TO RELATED APPLICATIONS

This application is a 371 U.S. national stage application of International Application No. PCT/KR2008/005942 filed on Oct. 9, 2008, which claims priority to U.S. Provisional Application Ser. No. 60/978,762 filed on Oct. 10, 2007, the contents of which is hereby incorporated by reference herein in its entirety.

TECHNICAL FIELD

The present disclosure is directed to a random access procedure for obtaining uplink time synchronization and access to a mobile communications network, and more specifically to an apparatus and method that allows a mobile terminal to map signature indexes onto cyclic shifted Zadoff-Chu (ZC) sequence.

BACKGROUND ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the $I_{ub}$ interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the $I_{ur}$ interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the $G_f$ interface, to the MSC 6 via the Gs interface, to the gateway GPRS support node (GGSN) 9 via the $G_N$ interface, and to the home subscriber server (HSS) via the $G_R$ interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the $N_B$ interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the $G_C$ interface and to the Internet via the $G_I$ interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control 240 (MAC) layer, via a transport channel. The MAC 240 layer and the physical layer exchange data via the transport channel.

The second layer (L2) includes a MAC 240 layer, a radio link control 230 (RLC) layer, a broadcast/multicast control 260 (BMC) layer, and a packet data convergence protocol 220 (PDCP) layer. The MAC 240 layer handles mapping between logical channels and transport channels and provides allocation of the MAC parameters for allocation and re-allocation of radio resources. The MAC 240 layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or in the uplink the radio access channel (RACH). The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information. The data units, or protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network, a function called header compression, for this purpose.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs).

A RB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods. The RRC also handles user mobility within the RAN and additional services, such as location services.

Some of the different possibilities for the mapping between the RBs and the transport channels for a given UE 1 may not be available at a given time. The UE 1/UTRAN 2 deduce the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

Initial access is a procedure whereby a UE 1 sends a first message to the UTRAN 2 using a common uplink channel, specifically the Random Access Channel (RACH). For both GSM and UMTS systems, the initial access procedure involves the UE 1 transmitting a connection request message that includes a reason for the request and receiving a response from the UTRAN 2 indicating the allocation of radio resources for the requested reason.

There are several reasons, or establishment causes, for sending a connection request message. Table I indicates the establishment causes specified in UMTS, specifically in 3GPP TS 25.331.

The "originating conversation call" establishment cause indicates that the UE 1 wants to setup a connection, for example, a speech connection. The "terminating conversation call" establishment cause indicates that that UE 1 answers to paging. The "registration" establishment cause indicates that that the user wants to register only to the network.

A physical random access procedure is used to send information over the air. The physical random access transmission is under control of a higher layer protocol, which performs important functions related to priority and load control. This procedure differs between GSM and UMTS radio systems.

The description of GSM random access procedure can be found in "The GSM System for Mobile Communications" published by M. Mouly and M. B. Pautet, 1992. The W-CDMA random access procedure is provided below.

The transport channel RACH and two physical channels (i.e., Physical Random Access Channel (PRACH) and Acquisition Indication Channel (AICH)), are utilized in this procedure. The transport channels are channels supplied by the physical layer to the protocol layer of the MAC layer. There are several types of transport channels to transmit data with different properties and transmission formats over the physical layer.

Physical channels are identified by code and frequency in Frequency Division Duplex (FDD) mode and are generally based on a layer configuration of radio frames and timeslots. The form of radio frames and timeslots depends on the symbol rate of the physical channel.

TABLE I

Establishment Causes

Originating Conversational Call
Originating Streaming Call
Originating Interactive Call
Originating Background Call
Originating Subscribed traffic Call
Terminating Conversational Call
Terminating Streaming Call
Terminating Interactive Call
Terminating Background Call
Emergency Call
Inter-RAT cell re-selection
Inter-RAT cell change order
Registration
Detach
Originating High Priority Signaling
Originating Low Priority Signaling
Call re-establishment
Terminating High Priority Signaling
Terminating Low Priority Signaling A radio frame is the minimum unit in the decoding process, consisting of 15 time slots. A time slot is the minimum unit in the Layer 1 bit sequence. Therefore, the number of bits that can be accommodated in one time slot depends on the physical channel.

The transport channel RACH is an uplink common channel used for transmitting control information and user data. The transport channel RACH is utilized in random access and used for low-rate data transmissions from a higher layer. The RACH is mapped to an uplink physical channel, specifically the PRACH. The AICH is a downlink common channel, which exists as a pair with PRACH used for random access control.

The transmission of PRACH is based on a slotted ALOHA approach with fast acquisition indication. The UE randomly selects an access resource and transmits a RACH preamble part of a random access procedure to the network.

A preamble is a short signal that is sent before the transmission of the RACH connection request message. The UE 1 repeatedly transmits the preamble by increasing the transmission power each time the preamble is sent until it receives the Acquisition Indicator (AI) on AICH, which indicates the detection of the preamble by the UTRAN 2. The UE 1 stops the transmission of the preamble once it receives the AI and sends the message part at the power level equal to the preamble transmission power at that point, adding an offset signaled by the UTRAN 2. FIG. 6 illustrates a power ramping procedure.

This random access procedure avoids a power ramping procedure for the entire message. A power ramping procedure would create more interference due to unsuccessfully sent messages and would be less efficient due to a larger delay since it would take much more time to decode the message before an acknowledgement could be transmitted to indicate successful receipt of the message.

One characteristics of the RACH is that it is a contention based channel subject to collisions due to simultaneous access of several users, which may preclude decoding of the initial access message by the network. The UE 1 can start the random access transmission of both preambles and message only at the beginning of an access slot. This access method is, therefore, a type of slotted ALOHA approach with fast acquisition indication The time axis of both the RACH and the AICH is divided into time intervals or access slots. There are 15 access slots per two frames, with each frame having a length of 10 ms or 38400 chips, and the access slots are spaced 1.33 ms or 5120 chips apart. FIG. 7 illustrates the number and spacing of access slots.

The UTRAN 2 signals information regarding which access slots are available for random access transmission and the timing offsets to use between RACH and AICH, between two successive preambles and between the last preamble and the message. For example, if the AICH transmission timing is 0 and 1, it is sent three and four access slots after the last preamble access slot transmitted, respectively. FIG. 8 illustrates the timing of the preamble, AI and message part The timing at which the UE 1 can send the preamble is divided by random access sub channels. A random access sub channel is a subset including the combination of the uplink access slots. There are 12 random access sub channels. A random access sub channel consists of the access slots indicated in Table II.

TABLE II

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

The preamble is a short signal that is sent before the transmission of the RACH message. A preamble consists of 4096 chips, which is a sequence of 256 repetitions of Hadamard codes of length 16 and scrambling codes assigned from the upper layer.

The Hadamard codes are referred to as the signature of the preamble. There are 16 different signatures and a signature is randomly selected from available signature sets on the basis of Access Service Classes (ASC) and repeated 256 times for each transmission of the preamble part. Table III lists the preamble signatures.

The message part is spread by Orthogonal Variable Spreading Factor (OVSF) codes that are uniquely defined by the preamble signature and the spreading codes for use as the preamble signature. The 10 ms long message part radio frame is divided into 15 slots, each slot consisting of 2560 chips.

TABLE III

| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

Each slot includes a data part and a control part that transmits control information, such as pilot bits and TFCI. The data part and the control part are transmitted in parallel. The 20 ms long message part consists of two consecutive message part radio frames. The data part consists of 10*2k bits, where k=0, 1, 2, 3, which corresponds to a Spreading Factor (SF) of 256, 128, 64, 32. FIG. 9 illustrates the structure of the random access message part.

The AICH includes a repeated sequence of 15 consecutive access slots, each slot having a length of 40 bit intervals or 5120 chips. Each access slot includes two parts, an Acquisition Indicator (AI) part consisting of 32 real-valued signals, such as a0 . . . a31, and a part having a length of 1024 chips during which transmission is switched off. FIG. 10 illustrates the structure of the AICH.

When the UTRAN 2 detects transmission of a RACH preamble having a certain signature in an RACH access slot, the UTRAN repeats this signature in the associated AICH access slot. Therefore, the Hadamard code used as the signature for the RACH preamble is modulated onto the AI part of the AICH.

The acquisition indicator corresponding to a signature can have a value of +1, -1 or 0 depending on whether a positive acknowledgement (ACK), a negative acknowledgement (NACK) or no acknowledgement is received in response to a specific signature. The positive polarity of the signature indicates that the preamble has been acquired and the message can be sent.

The negative polarity indicates that the preamble has been acquired and the power ramping procedure shall be stopped, but the message shall not be sent. This negative acknowledgement is used when a received preamble cannot be processed at the present time due to congestion in the UTRAN 2 and the UE 1 may repeat the access attempt some time later.

TABLE IV

| AC | Allocation |
|---|---|
| 15 | PLMN Staff |
| 14 | Emergency Services |
| 13 | Public Utilities (e.g. water/gas suppliers) |
| 12 | Security Services |
| 11 | |

The UEs 1 are members of one of ten randomly allocated mobile populations, defined as Access Classes (AC) 0 to 9. The population number is stored in the Subscriber Identity Module (SIM)/Universal Subscriber Identity Module (USIM). UEs 1 may also be members of one or more out of 5 special categories of Access Classes 11 to 15, which are allocated to specific high priority users and the information also stored in the SIM/USIM. Table IV lists the special AC and their allocation.

The UTRAN 2 performs the random access procedure at protocol layer L2 by determining whether to permit the UE 1 to use a radio access resource based primarily upon the AC to which the UE belongs.

It will be desirable to prevent UE 1 users from making access attempts, including emergency call attempts, or responding to pages in specified areas of a Public Land Mobile Network (PLMN) under certain circumstances. Such situations may arise during states of emergency or where 1 or more co-located PLMNs has failed. Broadcast messages should be available on a cell-by-cell basis to indicate the class(es) of subscribers barred from network access. The use of this facility allows the network operator to prevent overload of the access channel under critical conditions Access attempts are allowed if the UE 1 is a member of at least one AC that corresponds to the permitted classes as signaled over the air interface and the AC is applicable in the serving UTRAN 2. Access attempts are otherwise not allowed. Any number of these AC may be barred at any one time. Access Classes are applicable as indicated in Table V.

An additional control bit for AC 10 is also signaled over the air interface to the UE 1. This control bit indicates whether access to the UTRAN 2 is allowed for Emergency Calls for UEs 1 with access classes 0 to 9 or without an International Mobile Subscriber Identity (IMSI). Emergency calls are not allowed if both AC 10 and the relevant AC, 11 to 15 are barred for UEs 1 with access classes 11 to 15. Emergency calls are otherwise allowed.

TABLE V

| AC | Applicability |
|---|---|
| 0-9 | Home and Visited PLMNs |
| 11 and 15 | Home PLMN only |
| 12, 13, 14 | Home PLMN and visited PLMNs of home country only |

The AC are mapped to ASC In the UMTS. There are eight different priority levels defined, specifically ASC 0 to ASC 7, with level 0 representing the highest priority.

Access Classes shall be applied at initial access, such as when sending an RRC Connection Request message. A mapping between AC and ASC shall be indicated by the information element "AC-to-ASC mapping" in System Information Block type 5. The correspondence between AC and ASC is indicated in Table VI.

TABLE VI

| AC  | 0-9    | 10     | 11     | 12     | 13     | 14     | 15     |
|-----|--------|--------|--------|--------|--------|--------|--------|
| ASC | 1st IE | 2nd IE | 3rd IE | 4th IE | 5th IE | 6th IE | 7th IE |

In Table VI, "nth IE" designates an ASC number i in the range 0-7 to AC. The UE 1 behavior is unspecified if the ASC indicated by the "nth IE" is undefined.

The parameters implied by the respective ASC are utilized for random access. A UE 1 that is a member of several ACs selects the ASC for the highest AC number. The AC is not applied in connected mode.

An ASC consists of a subset of RACH preamble signatures and access slots that are allowed for the present access attempt and a persistence value corresponding to a probability, $Pv \leq 1$, to attempt a transmission. Another important mechanism to control random access transmission is a load control mechanism that reduces the load of incoming traffic when the collision probability is high or when the radio resources are low. A flow chart of the control access procedure is illustrated in FIG. 11.

Existing specifications provide many RACH transmission control parameters that are stored and updated by the UE 1 based on system information broadcast by the UTRAN 2. Transmission control parameters are received from RRC (S10). The transmission control parameters include PRACH, ASC, maximum number of preamble ramping cycles ($M_{max}$), range of backoff interval for timer ($T_{BO1}$) specified as a number of 10 ms transmission time intervals ($N_{BO1max}$) and ($N_{BO1min}$) and applicable when RACK is received on AICH.

When it is determined that there is data to transmit (S20), the UE 1 maps the assigned AC to an ASC (S30). A count value M is then set to zero (S40).

The count value M is then incremented by one (S50). The UE 1 determines if the count value M, which represents the maximum number of RACH transmission attempts, exceeds the maximum number of permitted RACH transmission attempts $M_{max}$ (S60).

The UE 1 treats the transmission as unsuccessful if M exceeds $M_{max}$. The UE 1 then indicates the unsuccessful transmission to a higher layer (S70)

However, the UE 1 proceeds with the RACH access procedure if M is less than or equal to $M_{max}$. The UE 1 updates the RACH transmission control parameters (S80). A 10 ms timer $T_2$ is set (S90) and the UE 1 determines whether to attempt transmission based on the persistence value $P_i$ associated with the ASC selected by the UE.

Specifically, a random number between 0 and 1, $R_i$, is generated (S100) and the random number is compared to the persistence value (S110). The UE 1 does not attempt transmission if $R_i$ is less than or equal to the persistence value $P_i$ and waits until the 10 ms timer $T_2$ expires (S120) before repeating the RACH access procedure by updating the RACH transmission control parameters (S80). However, the UE 1 attempts to transmit using assigned RACH resources (S130) if $R_i$ is less than or equal to the persistence value $P_i$.

The UE 1 determines whether the response from the network is an Acknowledgement (ACK), a Non-Acknowledgment (NACK) or no response (S150) after the access attempt is transmitted. The UE 1 begins message transmission (S160) if an ACK is received, thereby indicating receipt of the UE transmission by the UTRAN 2. The UE 1 does not transmit the message and repeats the RACH access procedure by incrementing the count value M (S50) if no response is received or a NACK is received, thereby indicating a failed receipt of the transmission by the network, for example, due to a collision.

The UE 1 waits until the 10 ms timer $T_2$ expires (S170) before repeating the RACH access procedure if no response was received. However, the UE 1 waits until the 10 ms timer $T_2$ expires (S180) and also randomly generates a back off value $N_{BO1}$ associated with the PRACH assigned to the UE and between $N_{BO1max}$ and $N_{BO1min}$ and waits an additional back off interval $T_{BO1}$ that is equal to 10 ms multiplied by the back off value $N_{BO1}$ (S190) before repeating the RACH access procedure if a NACK was received.

The physical layer (L1) random access procedure is initiated upon request from the MAC sub layer (L2). The physical layer receives information from a higher layer, specifically the RRC, before the physical random-access procedure is initiated and receives information from a higher layer, specifically the MAC, at each initiation of the physical random access procedure. The information is indicated in Table VII. The physical layer random-access procedure is illustrated in FIG. 12.

As illustrated in FIG. 12, one access slot in the random access subchannel that can be used for the given ASC is randomly selected from access slots that can be used in the next full access slot sets (S200). One access slot is randomly chosen from access slots that can be used in the next full access slot sets if there are no access slots available. One signature is then randomly selected from the set of available signatures within the given ASC (S210).

The preamble retransmission counter is set at Preamble Retrans Max (S220), which is the maximum number of preamble retransmission attempts. The preamble transmission power is set at Preamble Initial Power (S230), which is the initial transmission power of the preamble. The preamble is then transmitted according to the chosen uplink access slot, signature and set transmission power (S240).

The UE 1 then determines whether the UTRAN 2 detected the preamble (S250). No random access message is transmitted if a NACK is detected in the downlink access slot corresponding to the selected uplink access slot. A random access message is transmitted if an ACK is detected in the downlink access slot corresponding to the selected uplink access slot. The preamble is retransmitted if no response, specifically neither an ACK nor a NACK for the selected signature, is detected in the downlink access slot corresponding to the selected uplink access slot.

When no response is received, the next available access slot is selected from the random access subchannel within the given ASC (S260), a new signature is randomly selected from the available signatures within the given ASC (S270), the preamble transmission power is increased by the step width of the power ramping (Power Ramp Step) (S280) and the preamble retransmission counter is reduced by 1 (S290). The UE 1 then determines if the maximum number of retransmissions have been attempted (S300). This preamble re-transmission procedure is repeated for as long as the preamble retransmission counter exceeds 0 and no response is received. The MAC is informed that no ACK was received on AICH (S310) and the physical layer random access procedure is terminated once the retransmission counter reaches 0.

If an ACK is received, the transmission power of the control channel of the random access message is set at a level higher than the transmission power of the last preamble transmitted according to a power offset (S320) and the random access message is transmitted 3 or 4 uplink access slots after the uplink access slot of the last transmitted preamble depending on the AICH transmission timing parameter (S330). The higher layer is then informed of the receipt of the ACK and transmission of the random access message (S340) and the physical layer random access procedure is terminated.

TABLE VII

Information Related to Physical Random-Access Procedure

| Before Initiation of Procedure | Upon Initiating Procedure |
|---|---|
| Preamble scrambling code. | Transport Format for PRACH message part. |
| Message length in time (10 or 20 ms) | ASC of the PRACH transmission |
| AICH_Transmission_Timing parameter (0 or 1) | Data to be transmitted (Transport Block Set) |
| Set of available signatures and set of available RACH sub-channels for each Access Service Class (ASC). | |
| Power-ramping factor Power Ramp Step (integer > 0) | |
| Preamble Retrans Max parameter (integer > 0) | |
| Initial preamble power (Preamble_Initial_Power) | |
| Power offset in dB between power of the last transmitted preamble and power of the control part of the random-access message ($P_{p-m} = P_{message-control} - P_{preamble}$ measured) | |
| Set of Transport Format parameters (including power offset between the data part and the control part of the random-access message for each Transport Format) | |

If a NACK is received, no random access message is transmitted and no re-transmission of the preamble is performed. The MAC is informed that a NACK was received (S350) and the physical layer random access procedure is terminated.

FIG. 13 illustrates a signaling establishment procedure between a UE 1 and UTRAN 2. As illustrated in FIG. 13, the RRC Connection Request message is transmitted once the PRACH power control preambles have been acknowledged (S400). The RRC Connection Request message includes a reason for requesting the connection.

The UTRAN 2 determines which resources to reserve and performs synchronization and signaling establishment among radio network nodes, such as a NodeB 5 and serving RNC 4, depending on the request reason (S410). The UTRAN 2 then transmits the Connection Setup message to the UE 1, thereby conveying information about radio resource to use (S420).

The UE 1 confirms connection establishment by sending the Connection Setup Complete message to the UTRAN 2 (S430). The UE 1 transmits the Initial Direct Transfer message to the UTRAN 2 once the connection has been established (S440). The Initial Direct Transfer message includes information such as the UE identity, UE current location and the kind of transaction requested.

Authentication is then performed between the UE 1 and UTRAN 2 and security mode communication is established (S450). The actual set up information is delivered to the UTRAN 2 from the UE 1 via the Call Control Setup message (S460). The Call Control Setup message identifies the transaction and indicates the QoS requirements.

The UTRAN 2 initiates activities for radio bearer allocation by determining if there are sufficient resources available to satisfy the requested QoS and transmits the Call Control Complete message to the UE 1 (S470). The radio bearer is allocated according to the request if there are sufficient resources available. The UTRAN 2 may select either to continue allocation with a lowered QoS value, queue the request until sufficient radio resources become available or reject the call request if sufficient resources are not presently available.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

The 3G LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB in the LTE system. The following is the overview of the current LTE study assumption for RACH.

The random access procedure is classified into two categories; non-synchronized random access and synchronized random access. Only the non-synchronized random access procedure is considered herein.

Non-synchronized access is used when the uplink from a UE 1 has not been time synchronized or when the UE uplink loses synchronization. Non-synchronized access allows the UTRAN 2 to estimate and adjust the UE 1 transmission timing if necessary. Therefore the non-synchronized random access preamble is used for at least time alignment and signature detection.

FIG. 14 illustrates a random access burst. The message payload may include any additional associated signaling information, such as a random ID, Pathloss/Channel Quality indicator (CQI), or access purpose. A message payload up to 6 bits is transmitted in the random access burst along with the preamble as illustrated in FIG. 14.

A UE 1 randomly selects a signature from a group of signatures to distinguish between different UEs that attempt an access simultaneously. The preamble may have good auto-correlation properties in order for the UTRAN 2 to obtain an accurate timing estimate.

Additionally, different preambles should have good cross-correlation properties in order for the UTRAN 2 to distinguish between simultaneous access attempts for different UEs 1 using different signatures. A constant amplitude zero auto-correlation (CAZAC) sequence is used as a preamble signature sequence to achieve good detection probability.

Layer 1 shall receive the information listed in Table VIII from the higher layers prior to initiation of the non-synchronized physical random access procedure. The information is transmitted as part of the System Information from higher layers.

TABLE VIII

Information received from higher layers prior to initiation of the non-synchronized physical random access procedure
Random access channel parameters (number, frequency position, time period, and timing offset)
Preamble format for the cell
Number of root ZC sequences and sequence indices
Preamble mapping to implicit message (set of cause values, CQI quantization parameters, signature mapping)
Power ramping step size (note 0 dB step size is allowed)
Maximum number of preamble retransmissions FIG. 15 illustrates a call flow diagram for a non-synchronized physical random access procedure. As illustrated in FIG. 15, the physical layer (L1) random access procedure encompasses successful transmission of the random access preamble (message 1) and the random access response (message 2). The remaining messages are scheduled for transmission by the higher layer on the shared data channel and thus are not considered part of the L1 random access procedure. A random access channel is a 1.08 MHz portion of a subframe or set of consecutive subframes reserved for random access preamble transmissions.

A random access channel is randomly selected from the available non-synchronized random access channels and a preamble sequence is then randomly selected from the available preamble set based on the message to be transmitted. The random access procedure ensures that each of the allowed selections is chosen with equal probability.

The initial preamble transmission power level, which is set by the MAC, is determined using an open loop power control procedure. The transmission counter is set to the maximum number of preamble retransmissions.

A Random Access Preamble (message 1) is then transmitted using the selected random access channel, preamble sequence, and preamble transmission power. The L1 status "ACK on non-synchronized random access received" is reported to the higher layers, such as the MAC, and the physical random access procedure is terminated if a Random Access Response (message 2) corresponding to the transmitted preamble sequence (message 1) is detected. Another random access channel and preamble are randomly selected if no Random Access Response (message 2) corresponding to the transmitted preamble sequence (message 1) is detected.

Preamble retransmission occurs as long as the maximum transmission power and the maximum number of retransmissions have not been reached. The L1 status "no acknowledgment on non-synchronized random access" is reported to the higher layers, such as the MAC, and the physical random access procedure is terminated if the maximum transmission power or the maximum number of retransmissions has been reached.

The main purpose of the LTE (Long Term Evolution) random access procedure is to obtain uplink time synchronization and to obtain access to the network. A random access mechanism can be described where a preamble is sent from a UE1 to a NodeB 5 in order to determine the timing misalignment. The preamble structure is based on Zadoff-Chu sequences with Zero Correlation Zone (ZC-ZCZ) and different root sequence indices when the required number of zones cannot be generated.

The cyclic shift and ZC root sequence indexes are configured on a cell basis. The cyclic shift value or increment $N_{CS}$ is taken among sixteen pre-defined values. Several tables have been proposed. In the following description, the $N_{CS}$ table IX will be used as a reference. Table IX shows the sixteen pre-defined values for the Ncs.

TABLE IX

| Configuration # | # of root sequences (no cyclic shift restrictions) | Cyclic shift (samples) | Cell size (km) |
|---|---|---|---|
| 1 | 1 | 13 | 0.82 |
| 2 | 2 | 19 | 1.68 |
| 3 | 2 | 26 | 2.68 |
| 4 | 3 | 38 | 4.40 |
| 5 | 4 | 52 | 6.40 |
| 6 | 5 | 64 | 8.12 |
| 7 | 6 | 76 | 9.83 |
| 8 | 7 | 83 | 10.84 |
| 9 | 8 | 104 | 13.84 |
| 10 | 10 | 119 | 15.98 |
| 11 | 11 | 139 | 18.84 |
| 12 | 13 | 167 | 22.85 |
| 13 | 16 | 209 | 28.86 |
| 14 | 22 | 279 | 38.87 |
| 15 | 32 | 419 | 58.89 |
| 16 | 64 | 0 | 118.96 |

The auto/cross-correlation of CS-ZC sequences allows support for 64 signature opportunities with very little loss of performance. 16 Walsh-Hadamard opportunities are offered in the current UMTS RACH preamble. However, the CS-ZC performance assumes no or little Doppler spread or frequency shift. The CS-ZC sequence looses its zero-auto-correlation property in the presence of Doppler spread of frequency shift. High Doppler shifts induce correlation peaks in the receiver's bank of correlators offset by $c_{off}(u)$ or $N-c_{off}(u)$ from the desired peak when the $u^{th}$ root sequence of length N is transmitted. The cyclic offset $c_{off}(u)$ depends on the root index u. Different equivalent formulas of $c_{off}(u)$ where derived, such as the following equation:

$$c_{off}=(N \cdot m-1)/u \text{ where}$$

m is the smallest positive integer for which,
$c_{off}$ is an integer.
The formula may be further simplified to:

$$c_{off}=1/u \bmod N$$

The above solution addresses the issue of "masking" cyclic shift positions where side peaks are expected in the ZC root sequence. Therefore, for high speed cells where cyclic shift restrictions apply, more ZC root sequences need to be configured compared to low-medium speed cells. Additionally, side peaks restrict the possible cyclic shift range so as to prevent side peaks to occur within the cyclic shift region. This restriction on $N_{CS}$ is captured by the following formula:

$$N_{CS} \le d < (N - N_{CS})/2$$

where $$d = \begin{cases} c_{\textit{off}}, & 0 \le c_{\textit{off}} < N/2 \\ N - c_{\textit{off}}, & N/2 \le c_{\textit{off}} \end{cases}$$

If the ZC sequences are not ordered by increasing maximum tolerable high-speed cell size, some of the ZC sequences following the 1$^{st}$ sequence signaled by the eNodeB in a high-speed cell may not be compliant with the cell radius of that cell. Therefore, the noted sequences may be skipped The CM of the 839 possible ZC sequences may be considered when allocating different ZC sequences to a cell. As illustrated in FIGS. 16(*a*) and 16(*b*), the CM may vary by up to 2.5 dB depending on the ZC sequences used in a cell. The variation results in unfair detection probability depending on the signature randomly selected by the UE and reduces the overall coverage performance of the PRACH.

It has been proposed to order the ZC sequences may be ordered according to the CM or the cell size.

CM-based ordering allows multiple ZC sequences with similar CM properties to be used in the same cell, to effect homogeneous detection probability of root sequences used in a cell. CM-based ordering allows for CM-based ZC sequence planning. For example, low CM ZCs may be allocated to larger cells, where cell-edge UEs will most likely have tougher propagation conditions. FIG. 16(*a*) illustrates the CM variation as a function of the ZC sequence index. As can be seen, if N is the ZC sequence length, the CM roughly follows an increasing trend as root sequence index increases in addition to the symmetry between the r-th and (N−r)-th sequences. As a result, the simplest ZC sequence index ordering is:

$$1, N-1, 2, N-2, \ldots, r, N-r, \ldots, \lfloor N/2 \rfloor, \lceil N/2 \rceil.$$

A more exact ordering by increasing CM may be obtained, as illustrated in FIG. 16(*b*).

In a high speed cell, some ZC sequences may be compatible with the cell size, such as $N_{cs\text{-}hs}$. The algorithm includes incrementing the ZC sequence index from the first index configured in the cell until a compatible sequence index is found. Intermediate non-compatible indexes are skipped. Therefore, for high mobility cells, a different ordering is proposed that guarantees that the ZC sequences allocated to the same cell tolerate the same maximum cell size when cyclic shift restrictions are applied. The high-speed cell-size ordering provides the benefit of an easier sequence planning in high mobility cells. Prior art hybrid methods have proposed CM-based ordering within HS size groups.

As illustrated in FIGS. 17(*a*) and 17(*b*), the high-speed cell-size ordering is not compatible with the CM-based ordering. As illustrated in FIG. 17(*a*) the CM resulting from consecutive ZC sequences with high-speed cell size ordering is almost random within −1 to 2.5 dB. The same random ordering applies to the maximum cell radius of high-speed cells with CM-based ordering, as illustrated in FIG. 17(*b*).

Currently, only one $N_{cs}$ set is defined and used commonly-speed cells in both low-speed and high-speed cells. However, the $N_{cs}$ is not optimized for high-speed cells. Another set of cyclic shift values that are optimized for high-speed cells may be utilized. Two different $N_{cs}$ may be supported to distinguish low-speed and high-speed cells. Since only one unique ZC sequence hybrid ordering may be defined to be used by both low and high-speed cells, the HS groups may be defined according to the high-speed cell $N_{cs}$ set.

As illustrated in FIGS. 18(*a*) and (*b*), the ZC sequences are reordered according to their CM values within each group. The sequences are either descending, as illustrated in FIG. 18(*a*), or ascending, as illustrated in FIG. 18(*b*).

The CM ordering in adjacent groups are opposite to each other such that a continuum trend of CM is followed among consecutive groups. The hybrid alternate ordering ensures that consecutive sequences have close CM values when allocated to a cell, such that one cell may achieve consistent cell coverage and preamble detection. FIG. 18 illustrates two possible CM trends as a function of the Hybrid ZC indexing.

As illustrated in FIG. 19, the CM of the preamble sequences varies from −0.7 to 2.4 dB. In power limited cells the CM value below the CM of QPSK, which is 1.2 dB, may not be utilized for improving the coverage because UEs are not allowed to boost the mean power above their maximum power of 24 dBm. Therefore, as illustrated in FIG. 19, it is reasonable to divide the sequences to low and high CM groups such that the coverage of the sequences in the low CM groups is maximal while the coverage is smaller and variable for the sequences in the high CM group.

In alternate embodiments, allowing for flexible PRACH sequence set allocation would allow the operator to trade-off the reuse factor versus the PRACH CM-dependent coverage on a cell-by-cell basis. An operator may allow a small percentage of cells to slightly exceed the QPSK CM. For example, in a very large cell size, such as 60-100 km, a 0.5 dB CM difference from the QPSK CM would have little or no impact on the radio link performance.

Therefore, one or more CM thresholds may be specified for the LTE system. Only one of these values would be applied to the given cell and the use would be signaled to the UE. There may be various methods for signaling the UE.

DISCLOSURE

Technical Problem

The prior art specified only one CM threshold, therefore only one bit signal was necessary for the network signal to determine whether to consider the threshold when allocating root sequences.

For example, if the signaling bit is set to zero, the CM threshold is not considered. The UE will begin to allocate sequences from the root index as indicated by the network. If the possible cyclic shifts have been allocated from the same ZC sequence and the maximum number of signatures is not reached, then the next signatures are allocated from the next available root sequence index. If the previous root index was the last in the $N_{cs}$ group, then the first root index from the next group, N+1, may be used. This operation is repeated until the maximum number of required signatures has been obtained.

Additionally, if the signaling bit is set to one, the CM threshold may be considered. The UE will begin to allocate sequences from the root index from roots less than or equal to the QPSK CM. Specifically, when the allocation of root indexes reaches the limit of QPSK CM, the UE may move to the root of the next group which has a CM that is less than or equal to the QPSK CM.

The ZC index may be ordered based on a Cubic Metric (CM) of ZC sequences or the size of the cell radius. The present invention proposes a hybrid approach of CM and cell radius which maximizes the coverage of PRACH, simplifies the sequence planning and management, and satisfies the minimum reuse factor for sequence planning.

Technical Solution

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a method of selecting signatures for a random access in a wireless communication system is presented. The method includes receiving information comprising at least one root sequence index, a cyclic shift parameter, and a configuration parameter that corresponds to different power metric threshold values, providing at least one root sequence table for random access transmission according to the configuration parameter, and accessing the at least one root sequence table is accessed to generate a predetermined number of signatures for accessing the base station, the at least one root sequence table accessed according to the at least one root sequence index and the cyclic shift parameters, wherein the root sequence table comprises a plurality of root sequences arranged in first and second root sequence groups, the first root sequence group corresponding to signatures that are less than or equal to a predetermined cubic metric value and the second group corresponding to signatures that are greater than the predetermined cubic metric value.

In one feature, each of the first and second root sequence groups further comprise signature sub-groups that are arranged according to at least one of alternate power metric ordering in adjacent signature sub-groups and alternate maximum cyclic shift. Additionally, the root sequence table comprises 839 root sequences.

In another feature, the number of root sequences in each signature sub-group is modified in accordance to the configuration parameter. Additionally, the method provides a plurality of root sequence tables, each root sequence table comprising root sequences arranged in different order according to the predetermined cubic metric value.

In yet another feature, the method includes generating a second root sequence table from the at least one root sequence table, the second root sequence table having root sequences arranged in different order according to the predetermined cubic metric value.

In still yet another feature, the method includes receiving from the base station information including a high-speed bit that identifies the use either the first or second root sequence groups of the root sequence table.

In another embodiment a method of selecting signatures for a random access in a wireless communication system is presented. The method includes transmitting to a mobile terminal information comprising at least one root sequence index, a cyclic shift parameter, a configuration parameter that corresponds to different power metric threshold values, or a combination thereof, providing at least one root sequence table for random access transmission according to the configuration parameter, and accessing the at least one root sequence table is accessed to generate a predetermined number of signatures for accessing the base station, the at least one root sequence table accessed according to the at least one root sequence index and the cyclic shift parameters, wherein the root sequence table comprises a plurality of root sequences arranged in first and second root sequence groups, the first root sequence group corresponding to signatures that are less than or equal to a predetermined cubic metric value and the second group corresponding to signatures that are greater than the predetermined cubic metric value.

In yet another embodiment, a mobile terminal for of establishing a communication link with a network is presented. The mobile terminal includes a transmitting/receiving unit receiving information comprising at least one root sequence index, a cyclic shift parameter, and a configuration parameter that corresponds to different power metric threshold values, a display unit displaying user interface information, an input unit receiving inputs from a user, and a processing unit processing the received configuration parameters to provide at least one root sequence table for random access transmission according to the configuration parameter and accessing the at least one root sequence table to generate a predetermined number of signatures for accessing the base station, the at least one root sequence table accessed according to the at least one root sequence index and the cyclic shift parameters, wherein the root sequence table comprises a plurality of root sequences arranged in first and second root sequence groups, the first root sequence group corresponding to signatures that are less than or equal to a predetermined cubic metric value and the second group corresponding to signatures that are greater than the predetermined cubic metric value.

In still yet another embodiment, a network for establishing a communication link with a mobile terminal is presented. The network includes, a transmitter transmitting information comprising at least one root sequence index, a cyclic shift parameter, and a configuration parameter that corresponds to different power metric threshold values, a receiver receiving messages from the mobile terminal, and a controller processing the received configuration parameters to provide at least one root sequence table for random access transmission according to the configuration parameter and accessing the at least one root sequence table to generate a predetermined number of signatures for accessing the base station, the at least one root sequence table accessed according to the at least one root sequence index and the cyclic shift parameters, wherein the root sequence table comprises a plurality of root sequences arranged in first and second root sequence groups, the first root sequence group corresponding to signatures that are less than or equal to a predetermined cubic metric value and the second group corresponding to signatures that are greater than the predetermined cubic metric value.

Advantageous Effects

The present invention proposes a hybrid approach of CM and cell radius which maximizes the coverage of PRACH, simplifies the sequence planning and management, and satisfies the minimum reuse factor for sequence planning.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

BEST MODE

The present invention allows a hybrid approach of using Cubic Metric (CM) and cell radius for ordering the Zadoff-Chu (ZC) root sequence index. The classification of root ZC sequences by CM value is required to keep the coverage of PRACH and to ensure correct root allocation by the UE. The present invention allows the CM thresholds to be signaled by the network to the UE. If the CM thresholds are fixed in a specification then the network may signal to the UE to indicate whether the UE should use the fixed thresholds.

The present invention merges both high-speed cell size and CM-based ZC ordering in order to benefit from the advantages provided by both solutions. The current embodiment of the present invention classifies ZC sequences into high-speed (HS) cell size groups and CM groups. Each group is sorted by increasing CM and HS cell sizes. The HS cell size groups are categorized according to the pre-defined $N_{cs}$ values.

One embodiment proposes HS size ordering within CM groups.

As mentioned above, Table IX is a reference for the limited set of cyclic shift values, $N_{cs}$. Table IX was proposed to minimize the number of used root sequences for low-speed cells where no cyclic shift restrictions apply. The $N_{cs}$ is taken from among sixteen pre-defined values which form sixteen groups of allowed root sequences for a given cell size. As shown in Table IX, within each group root sequences are further ordered by CM values. When the required number of sequences cannot be generated from one group, group N, then the root sequences are allocated from the next group, group N+1. In some scenarios, such as limited power cells, the allocated root sequences need to have the same CM properties, therefore the CM threshold needs to be known by the UE an whether or not it is applied to a given cell.

The present embodiment of the current invention specifies more than one CM threshold. The allocation is similar to the examples discussed above. However, networks may transmit various bits corresponding to the CM threshold configuration. Table XI illustrates an embodiment of a table that may be used if more than one CM threshold is specified.

Figure 1:
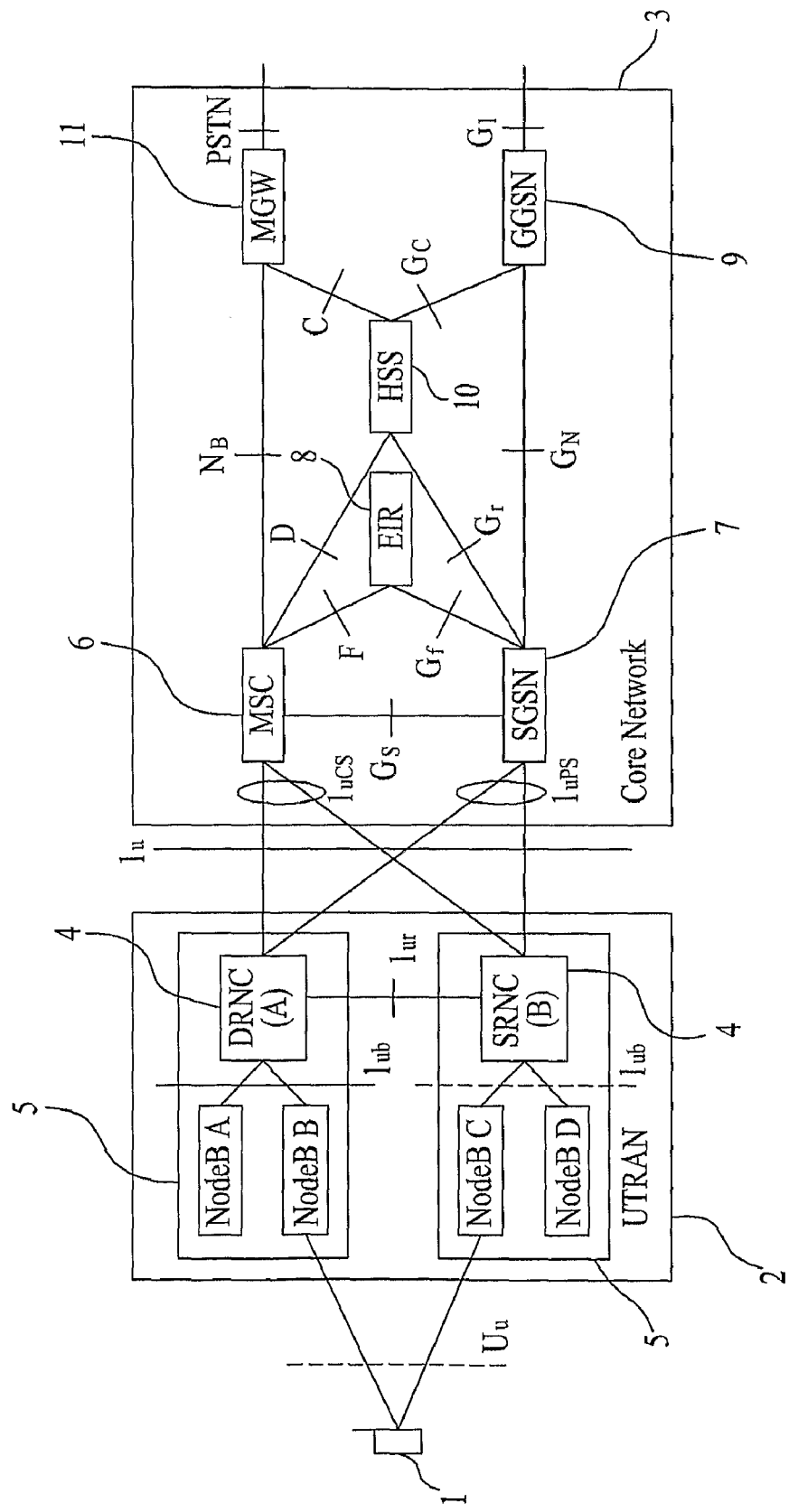
FIG. 1 illustrates an overview of a UMTS network.
Figure 2:
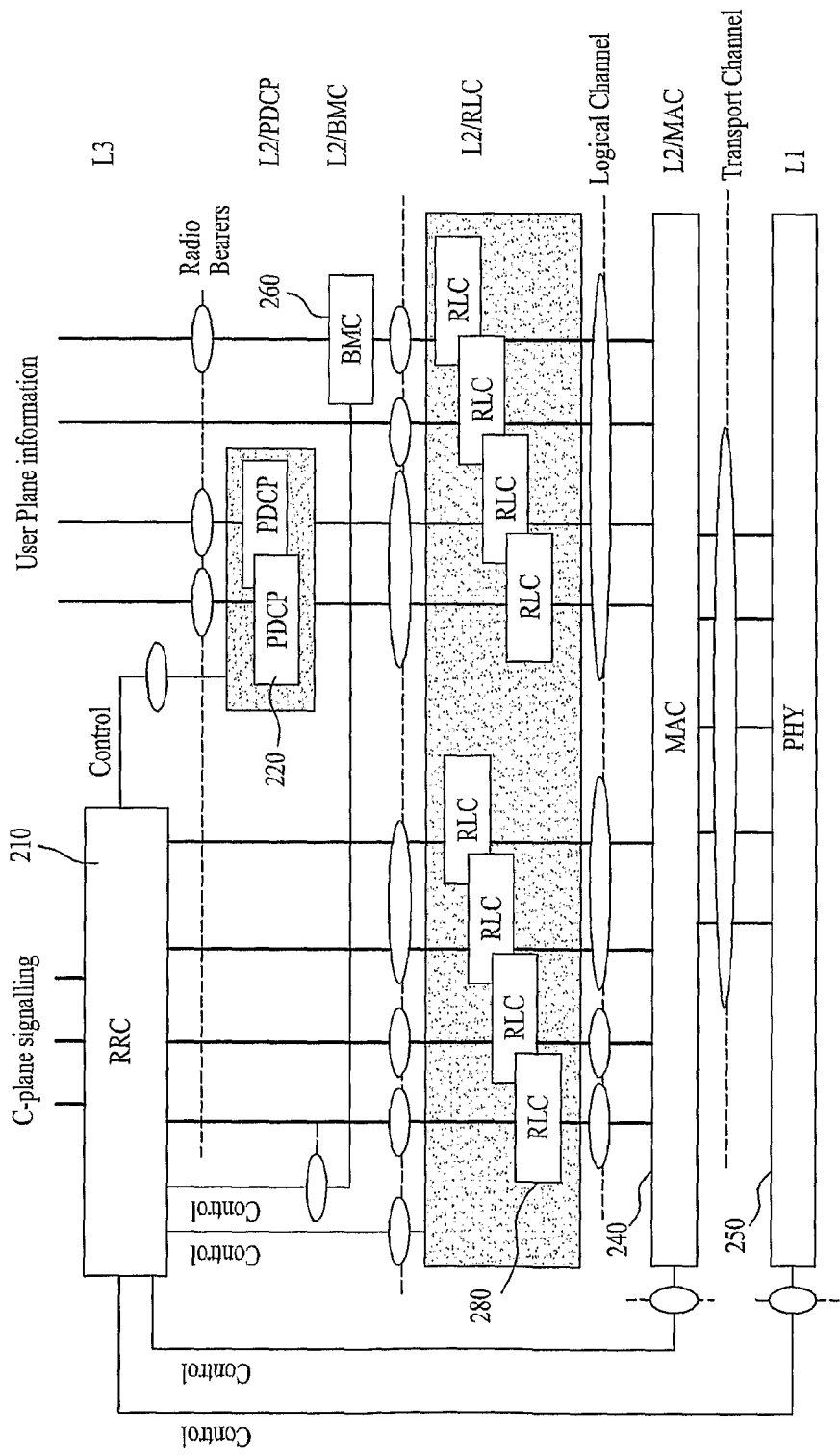
FIG. 2 illustrates a structure of a radio interface protocol between a UE and the UTRAN according to the 3GPP radio access network standards.
Figure 3:
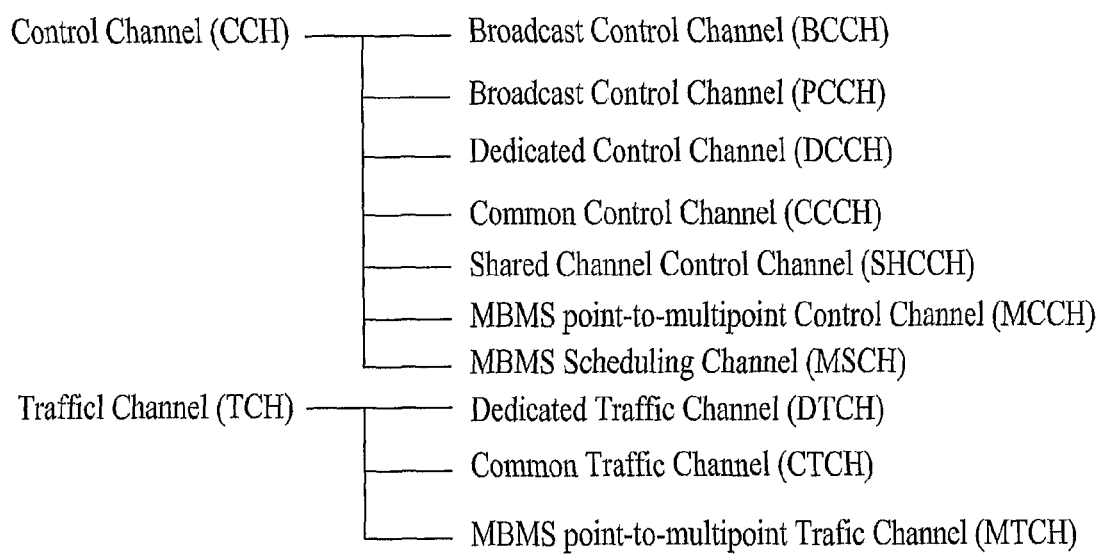
FIG. 3 illustrates the different logical channels.
Figure 4:
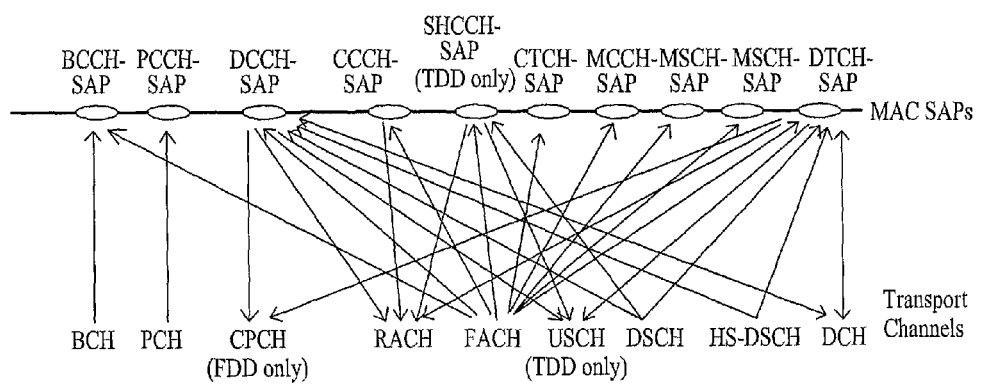
FIG. 4 illustrates logical channels mapped onto transport channels as seen from the UE side.
Figure 5:
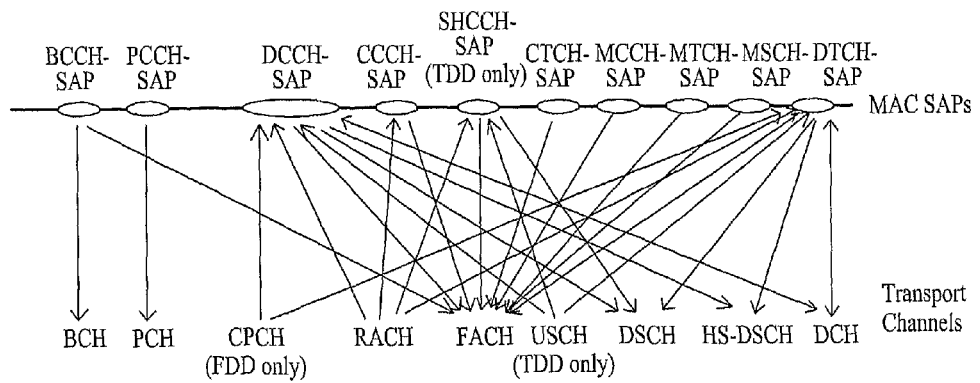
FIG. 5 illustrates logical channels mapped onto transport channels as seen from the UTRAN side.
Figure 6:
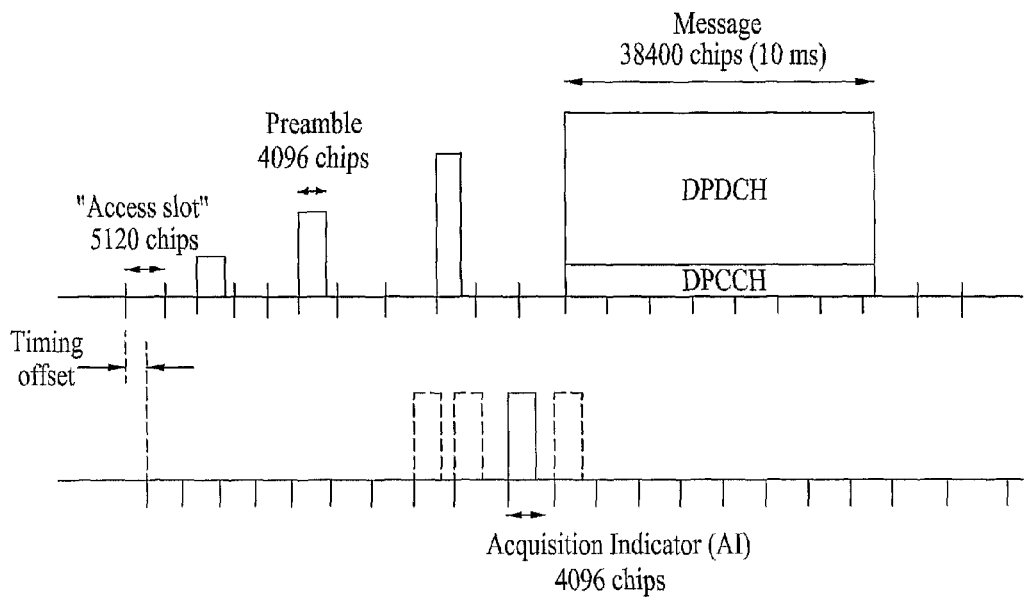
FIG. 6 illustrates a power ramping procedure.
Figure 7:
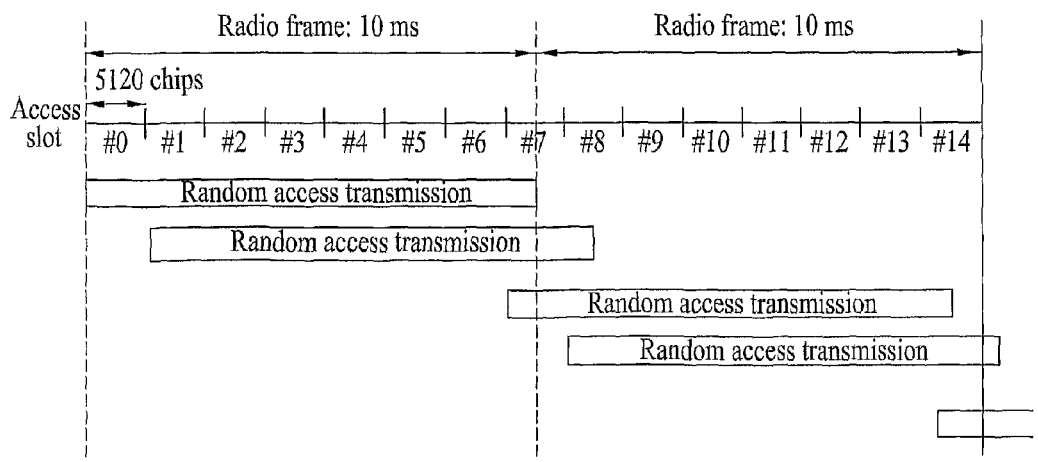
FIG. 7 illustrates the number and spacing of access slots.
Figure 8:
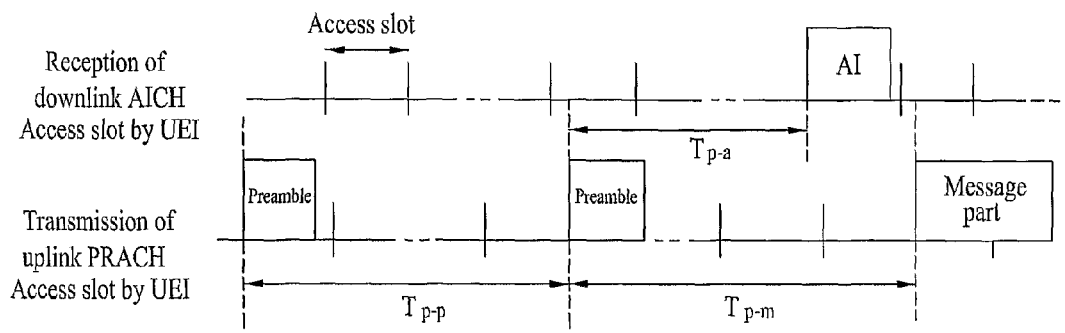
FIG. 8 illustrates the timing of the preamble, Access Indicator and message part.
Figure 9:
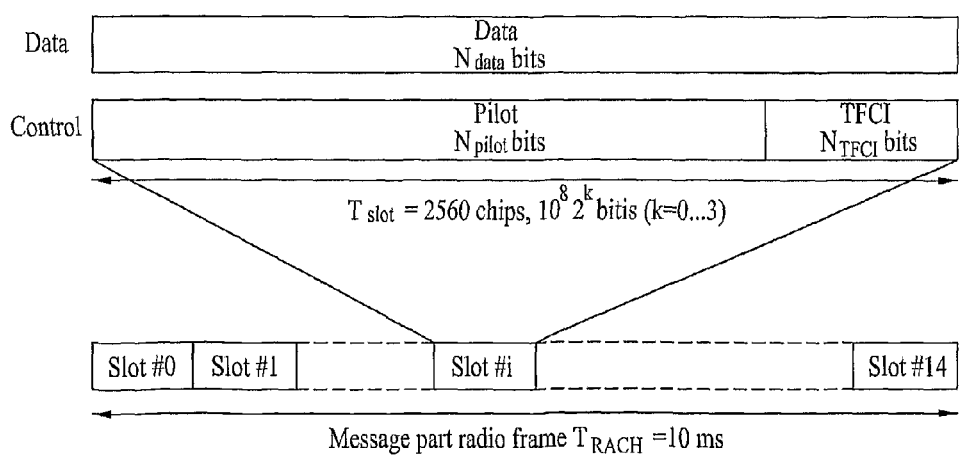
FIG. 9 illustrates the structure of the random access message part.
Figure 10:
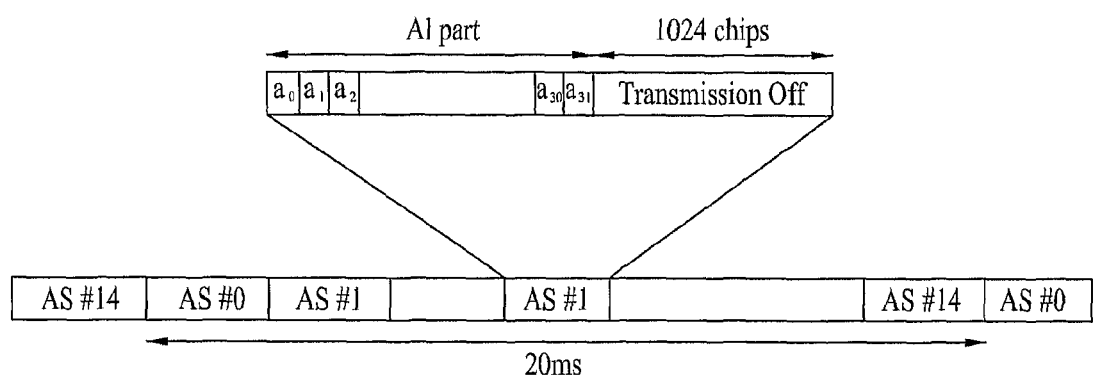
FIG. 10 illustrates the structure of the AICH.
Figure 11:
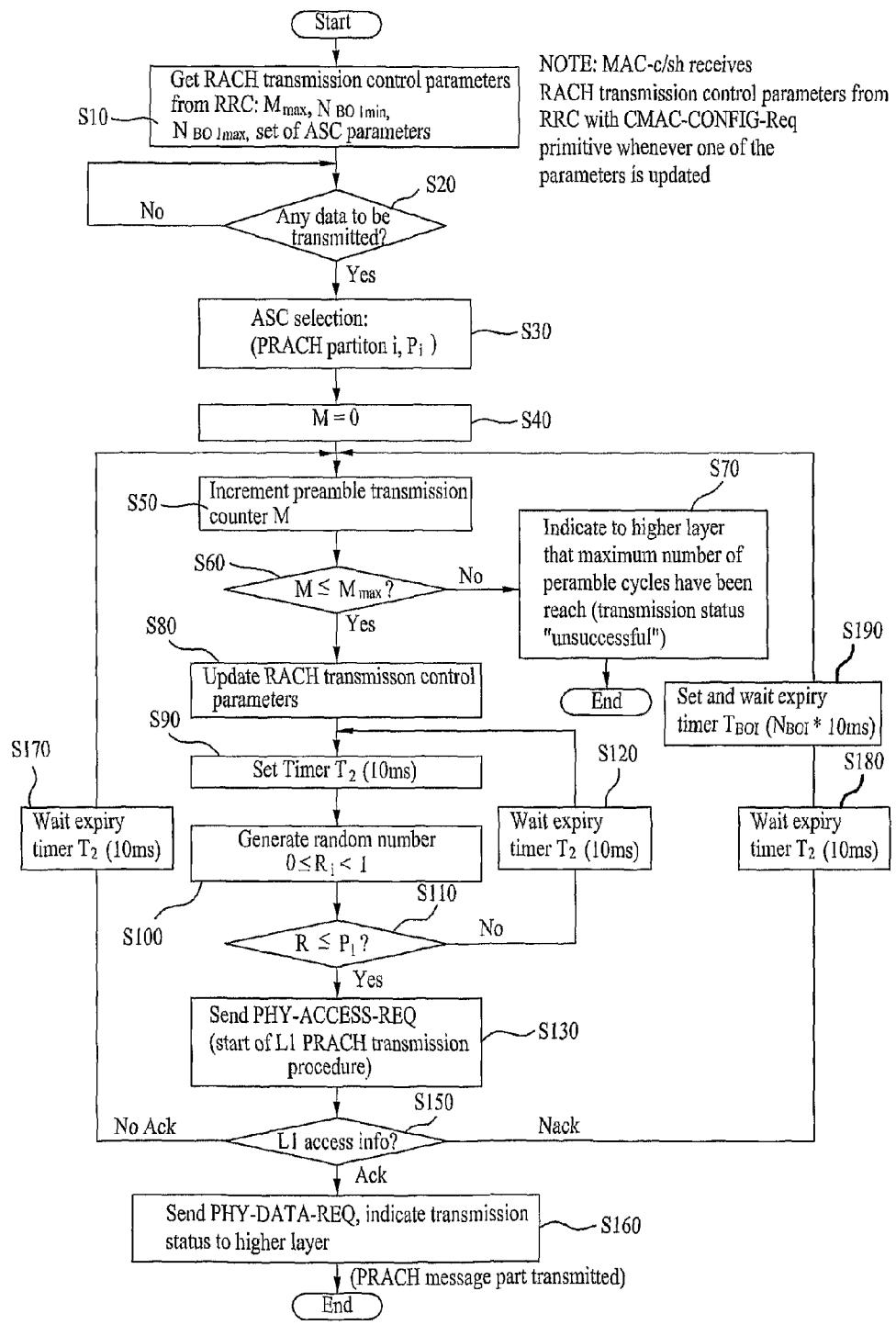
FIG. 11 illustrates a control access procedure.
Figure 12:
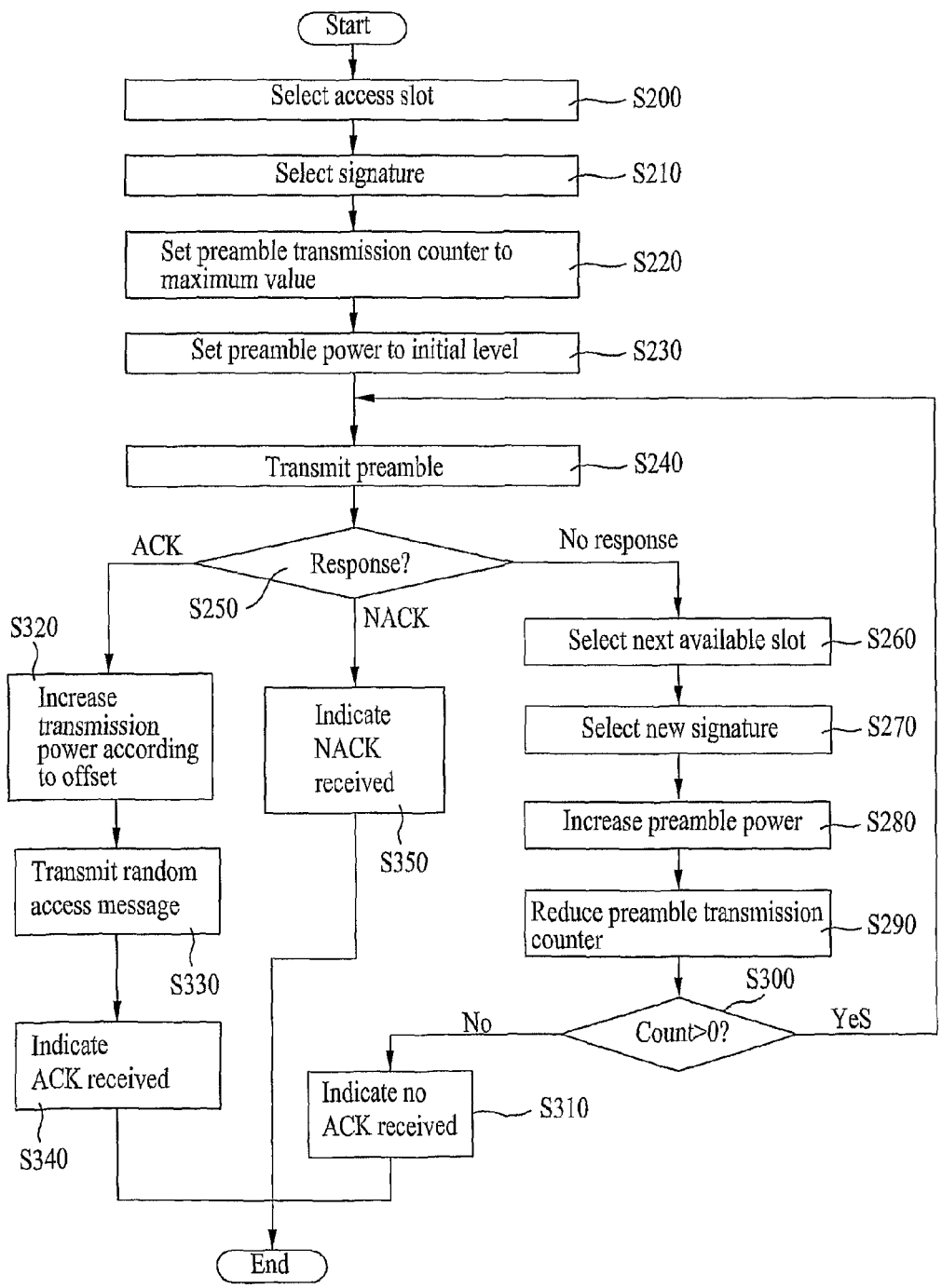
FIG. 12 illustrates a physical layer random-access procedure.
Figure 13:
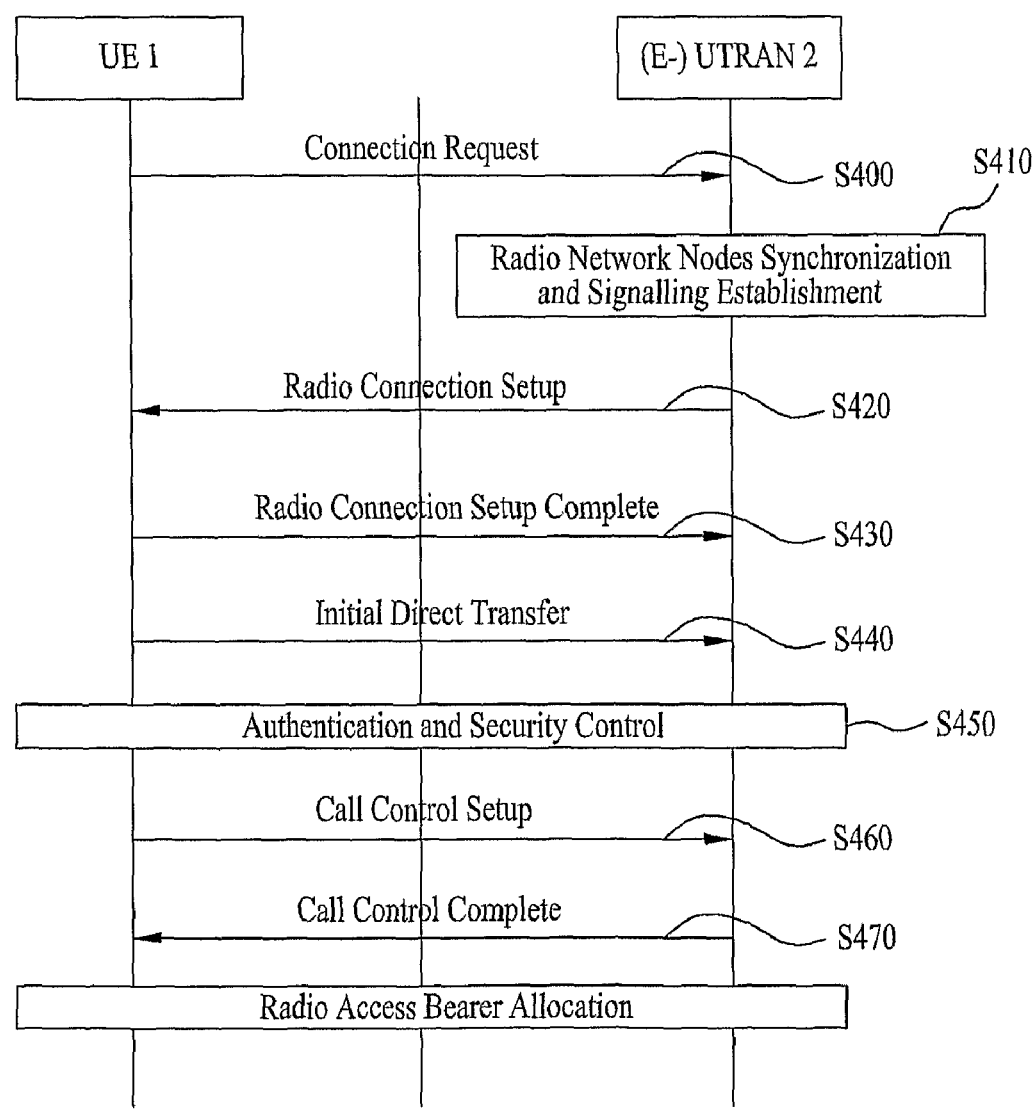
FIG. 13 illustrates a signaling establishment procedure between a UE and network.
Figure 14:
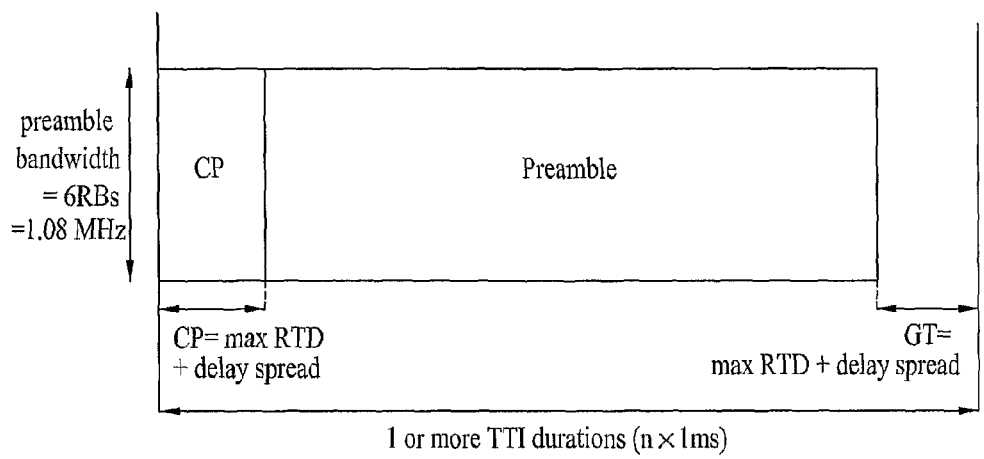
FIG. 14 illustrates a random access burst.
Figure 15:
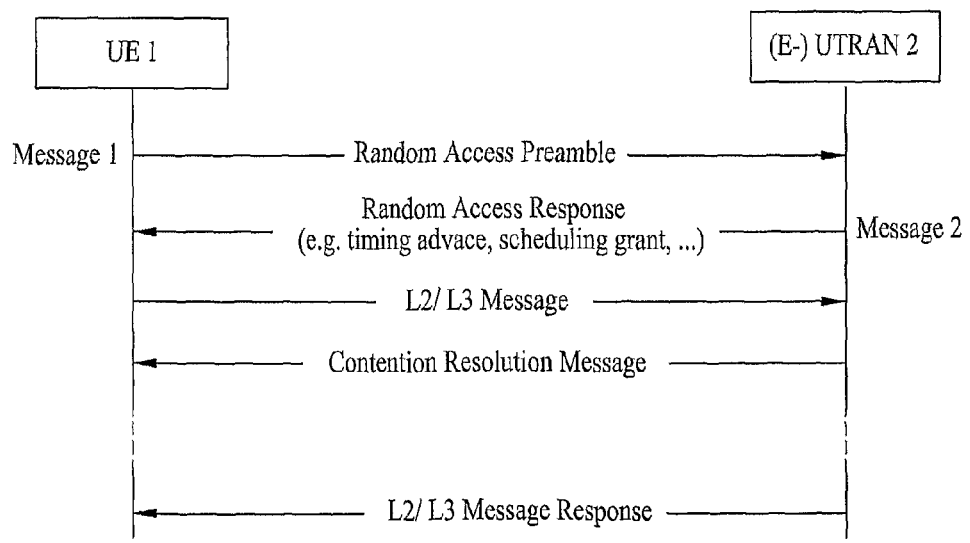
FIG. 15 illustrates a call flow diagram for a non-synchronized physical random access procedure.
Figure 16:
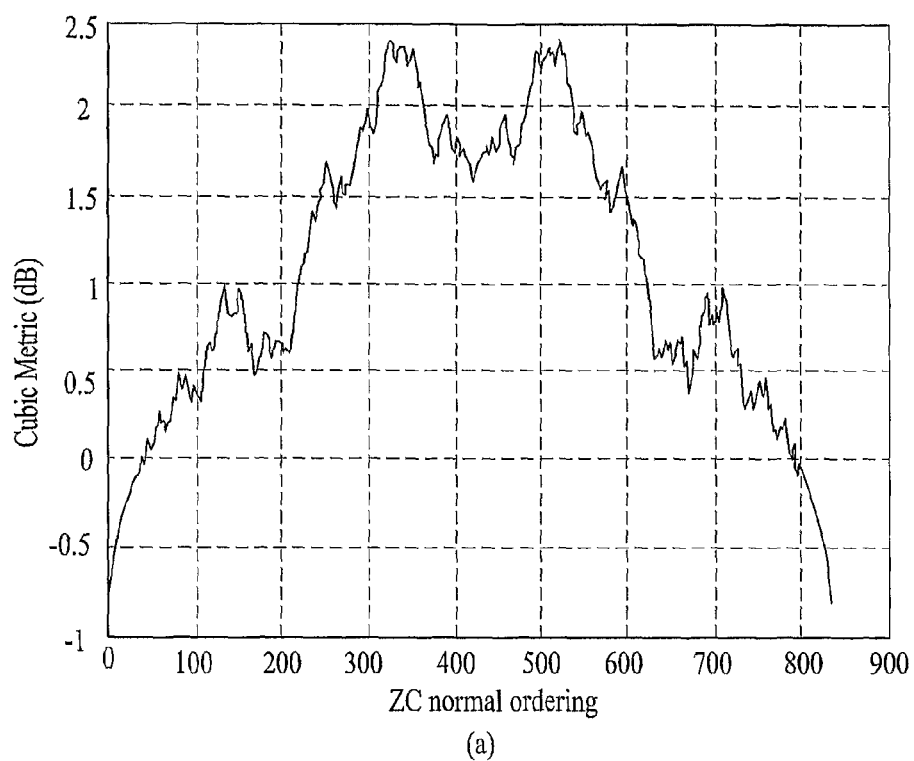
FIG. 16 illustrates CM and ZC sequences.
Figure 16:
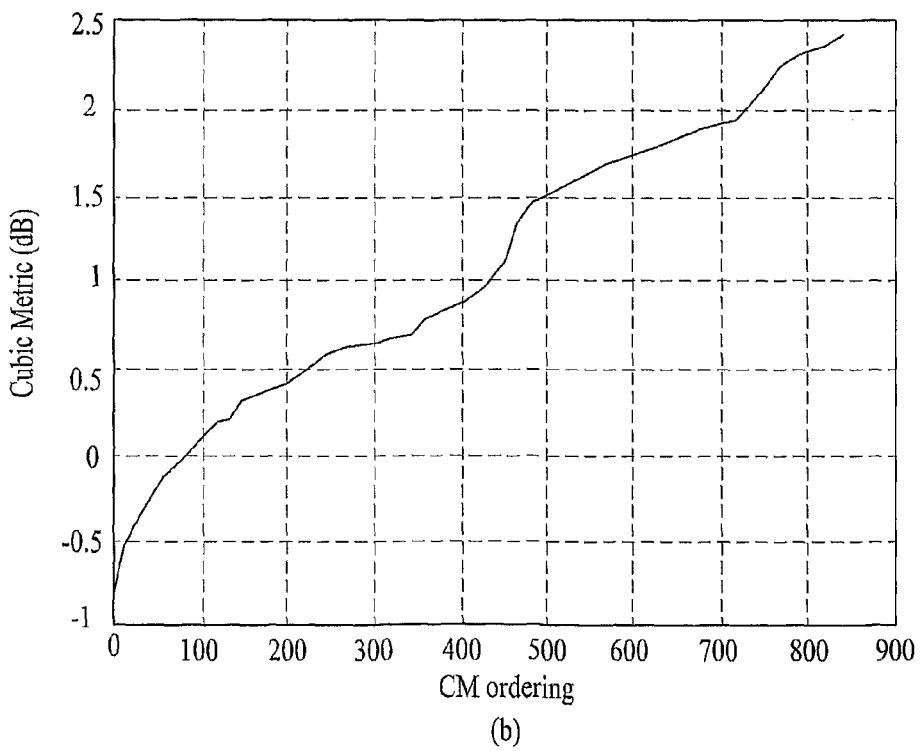
Figure 17:
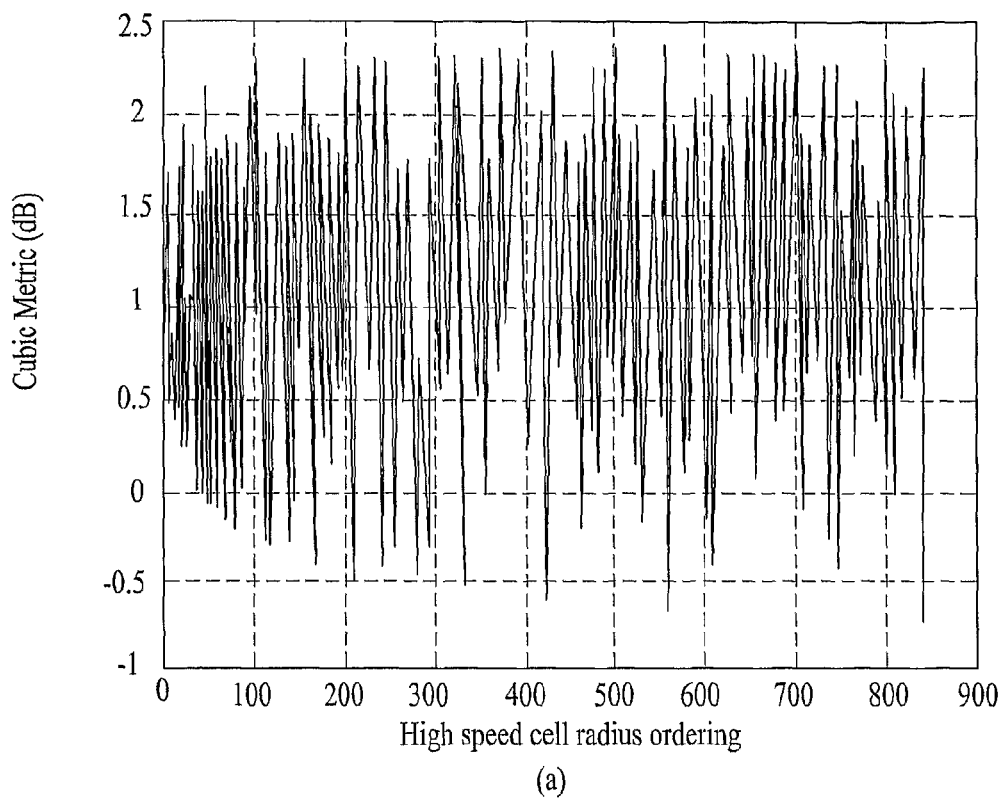
FIG. 17 illustrates CM of ZC sequences with high-speed cell size and high-speed cell size of ZC sequences with CM ordering.
Figure 17:
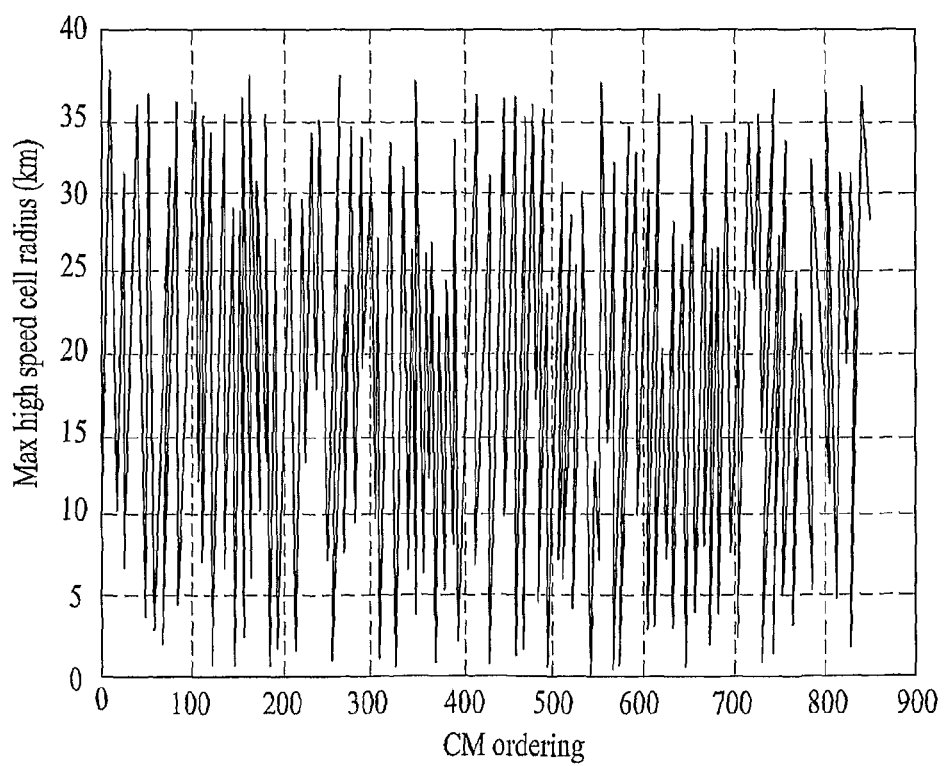
Figure 18:
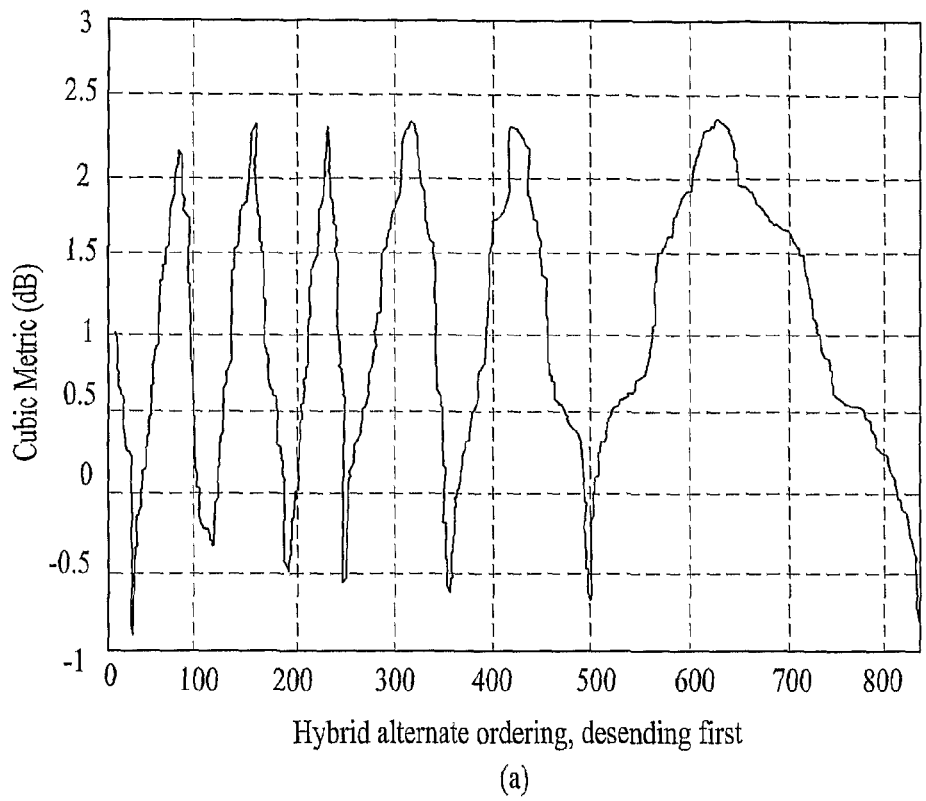
FIG. 18 illustrates ascending and descending sequence reordering according to the CM values within each group, in accordance with one embodiment of the present invention.
Figure 18:
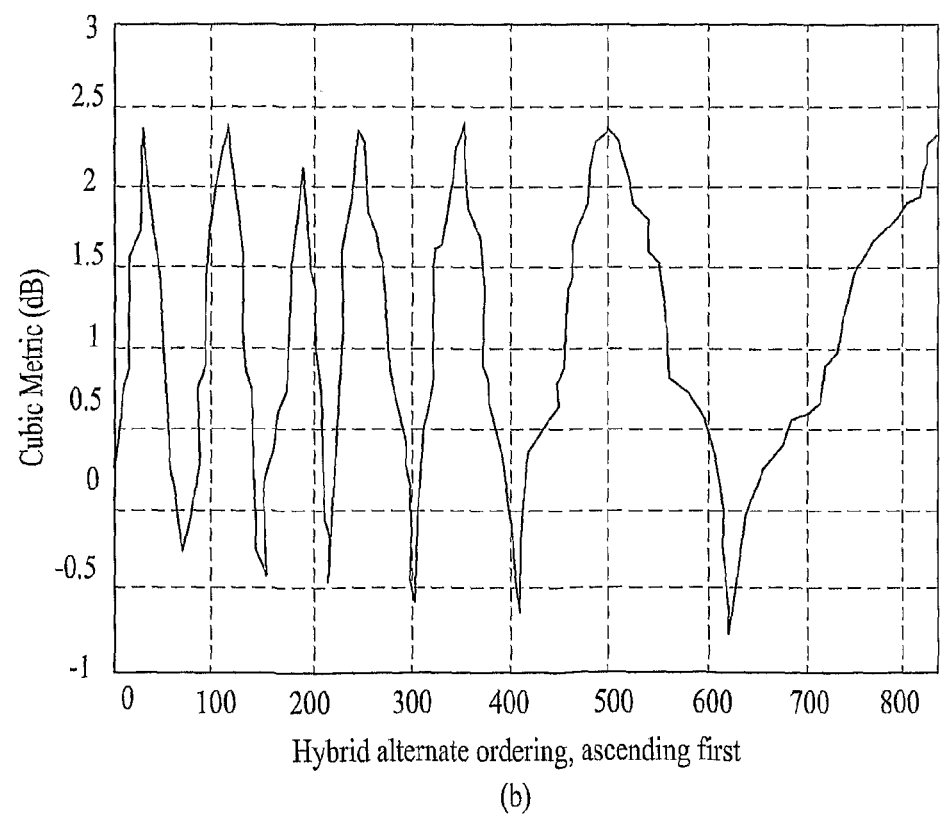
Figure 19:
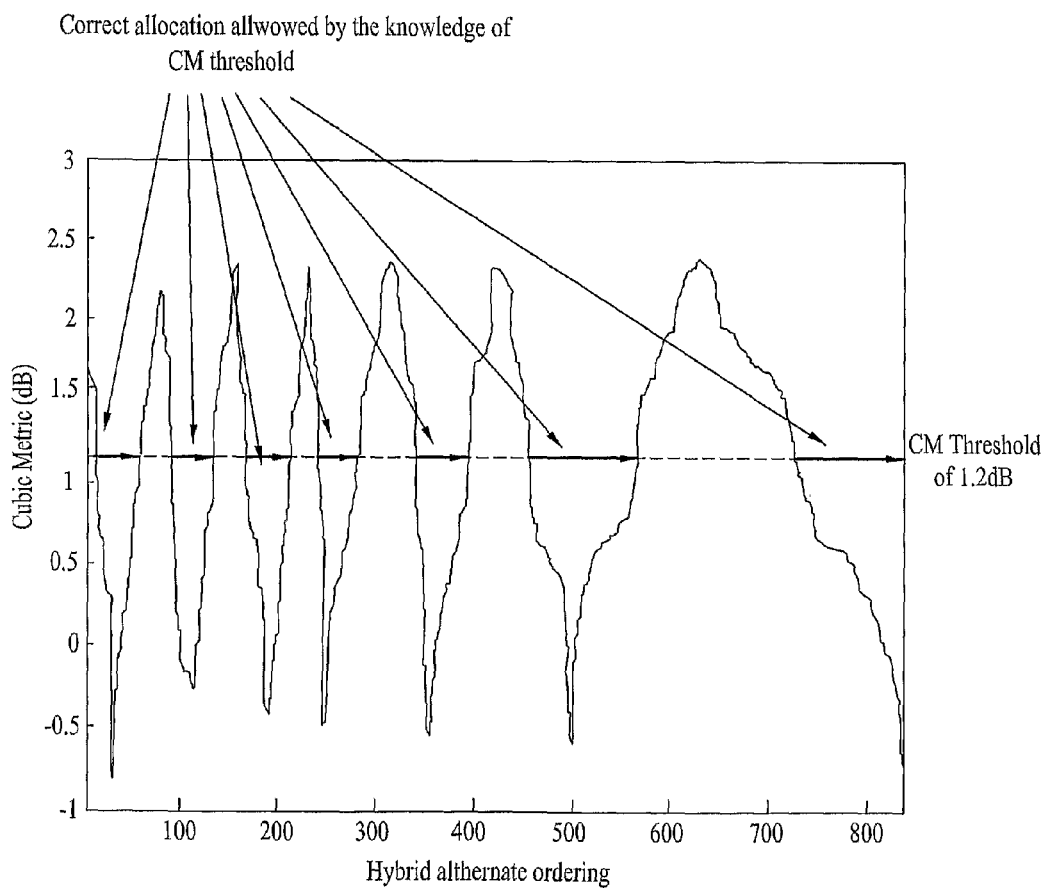
FIG. 19 illustrates a descending hybrid alternate ordering with the CM threshold of 1.2 dB for QPSK modulation, in accordance with one embodiment of the present invention.
Figure 20:
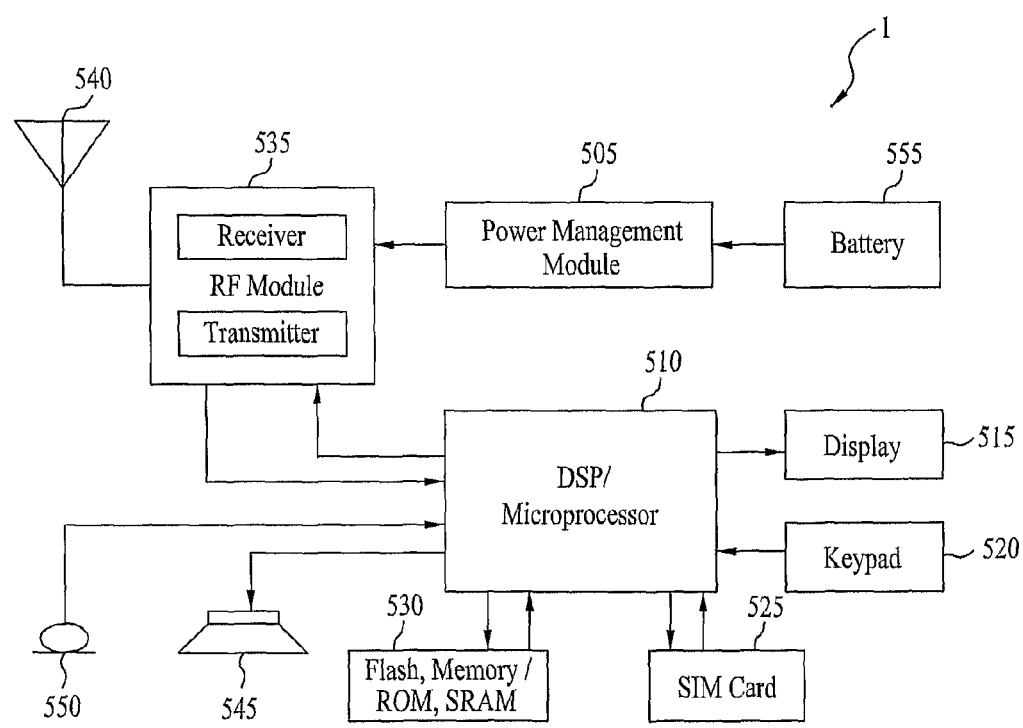
FIG. 20 illustrates a block diagram of a mobile station (MS) or access terminal (AT), in accordance with one embodiment of the present invention.

FIG. 20 illustrates a block diagram of a mobile station (MS) or UE 1. The AT 2 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

TABLE XI

| Configuration | CM Threshold | Bit 1 | Bit 2 | Bit N |
|---|---|---|---|---|
| 0 | None | X | Y | Z |
| 1 | 1.2 | ... | ... | ... |
| 2 | 1.7 | ... | ... | ... |
| 3 | 1.8 | ... | ... | ... |
| ... | ..., | ... | ... | ... |
| ... | ... | ... | ... | ... |
| ... | ..., | ... | ... | ... |
| I | ..., , | ... | ... | ... |

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

The present disclosure is directed to a random access procedure for obtaining uplink time synchronization and access to a mobile communications network, and more specifically to an apparatus and method that allows a mobile terminal to map signature indexes onto cyclic shifted Zadoff-Chu (ZC) sequence.

The invention claimed is:

1. A method of selecting signatures for random access in a wireless communication system, the method comprising:
   receiving information comprising at least one root sequence index, a cyclic shift parameter, and a configuration parameter that corresponds to different power metric threshold values;
   providing at least one root sequence table for random access transmission according to the configuration parameter; and
   accessing the at least one root sequence table in order to generate a predetermined number of signatures, the at least one root sequence table accessed according to the at least one root sequence index and the cyclic shift parameter,
   wherein the at least one root sequence table comprises a plurality of root sequences arranged in a first root sequence group and a second root sequence group, the first root sequence group corresponding to signatures that are less than or equal to a predetermined cubic metric value and the second root sequence group corresponding to signatures that are greater than the predetermined cubic metric value,
   wherein each of the first root sequence group and the second root sequence group further comprises signature sub-groups that are arranged according to at least one alternate power metric ordering in adjacent signature sub-groups or alternate maximum cyclic shift.

2. The method of claim 1, wherein the at least one root sequence table further comprises 839 root sequences.

3. The method of claim 1, further comprising modifying a number of root sequences in each signature sub-group according to the configuration parameter.

4. The method of claim 1, further comprising providing a plurality of root sequence tables each comprising root sequences arranged in different order according to the predetermined cubic metric value.

5. The method of claim 1, further comprising generating a second root sequence table from the at least one root sequence table, the second root sequence table having root sequences arranged in different order according to the predetermined cubic metric value.

6. The method of claim 1, further comprising receiving information comprising a high speed bit that identifies use of either the first root sequence group or the second root sequence group.

7. A method of selecting signatures for random access in a wireless communication system, the method comprising:
   transmitting information comprising at least one root sequence index, a cyclic shift parameter or a configuration parameter that corresponds to different power metric threshold values;
   providing at least one root sequence table for random access transmission according to the configuration parameter; and
   accessing the at least one root sequence table in order to generate a predetermined number of signatures for accessing a base station, the at least one root sequence table accessed according to the at least one root sequence index and the cyclic shift parameter,
   wherein the at least one root sequence table comprises a plurality of root sequences arranged in a first root sequence group and a second root sequence group, the first root sequence group corresponding to signatures that are less than or equal to a predetermined cubic metric value and the second root sequence group corresponding to signatures that are greater than the predetermined cubic metric value,
   wherein each of the first root sequence group and the second root sequence group further comprises signature sub-groups that are arranged according to at least one alternate power metric ordering in adjacent signature sub-groups or alternate maximum cyclic shift.

8. The method of claim 7, wherein the at least one root sequence table comprises 839 root sequences.

9. The method of claim 7, further comprising modifying a number of root sequences in each signature sub-group according to the configuration parameter.

10. The method of claim 7, further comprising providing a plurality of root sequence tables each comprising root sequences arranged in different order according to the predetermined cubic metric value.

11. The method of claim 7, further comprising generating a second root sequence table from the at least one root sequence table, the second root sequence table having root sequences arranged in different order according to the predetermined cubic metric value.

12. The method of claim 7, further comprising transmitting information comprising a high speed bit that identifies use of either the first root sequence group or the second root sequence group.

13. A mobile terminal for establishing a communication link with a network, the mobile terminal comprising:
   a transmitting/receiving unit for receiving information comprising at least one root sequence index, a cyclic shift parameter, and a configuration parameter that corresponds to different power metric threshold values;
   a display unit for displaying user interface information;
   an input unit for receiving inputs from a user; and
   a processing unit for processing the received configuration parameter in order to provide at least one root sequence table for random access transmission according to the configuration parameter and for accessing the at least one root sequence table in order to generate a predetermined number of signatures, the at least one root sequence table accessed according to the at least one root sequence index and the cyclic shift parameter,
   wherein the at least one root sequence table comprises a plurality of root sequences arranged in a first root sequence group and a second root sequence group, the first root sequence group corresponding to signatures that are less than or equal to a predetermined cubic metric value and the second root sequence group corresponding to signatures that are greater than the predetermined cubic metric value,
   wherein each of the first root sequence group and the second root sequence group further comprises signature sub-groups that are arranged according to at least one alternate power metric ordering in adjacent signature sub-groups or alternate maximum cyclic shift.

14. A network for establishing a communication link with a mobile terminal, the network comprising:
   a transmitter for transmitting information comprising at least one root sequence index, a cyclic shift parameter, and a configuration parameter that corresponds to different power metric threshold values;
   a receiver for receiving messages; and
   a controller for processing the received configuration parameter in order to provide at least one root sequence table for random access transmission according to the configuration parameter and for accessing the at least one root sequence table in order to generate a predetermined number of signatures for accessing a base station, the at least one root sequence table accessed according to the at least one root sequence index and the cyclic shift parameter, wherein the at least one root sequence table comprises a plurality of root sequences arranged in a first root sequence group and a second root sequence group, the first root sequence group corresponding to signatures that are less than or equal to a predetermined cubic metric value and the second root sequence group corresponding to signatures that are greater than the predetermined cubic metric value, wherein each of the first root sequence group and the second root sequence group further comprises signature sub-groups that are arranged according to at least one alternate power metric ordering in adjacent signature sub-groups or alternate maximum cyclic shift.

* * * * *